March 24, 1925.

W. G. ANDERSON

SMOKER'S STAND

Filed July 29, 1924

1,531,248

INVENTOR
Walker G. Anderson
BY
Pierre Barnes
ATTORNEY

Patented Mar. 24, 1925.

1,531,248

UNITED STATES PATENT OFFICE.

WALKER G. ANDERSON, OF SEATTLE, WASHINGTON, ASSIGNOR OF ONE-HALF TO CHARLES D. C. HUESTIS, OF SEATTLE, WASHINGTON.

SMOKER'S STAND.

Application filed July 29, 1924. Serial No. 728,869.

*To all whom it may concern:*

Be it known that I, WALKER G. ANDERSON, a citizen of the United States, residing at Seattle, in the county of King and State of Washington, have invented certain new and useful Improvements in Smokers' Stands, of which the following is a specification.

The present invention relates to improvements in smokers' stands.

The object of my invention is to produce a stand of this character which will be of simple and inexpensive construction, having few parts including an ash receptacle which is most conveniently removable for emptying.

The invention consists in a new and useful arrangement and combination of parts, as will be more fully hereinafter described and claimed.

In the accompanying drawing,—

Figure 1:
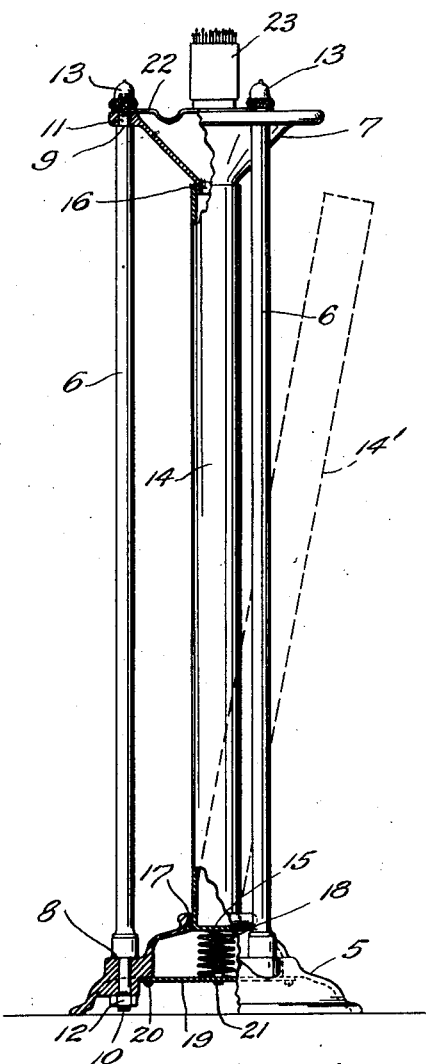
Figure 2:
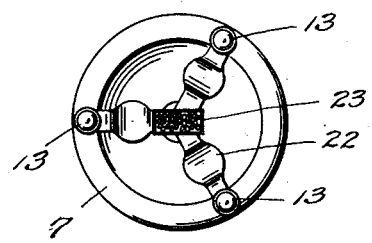
Figure 3:
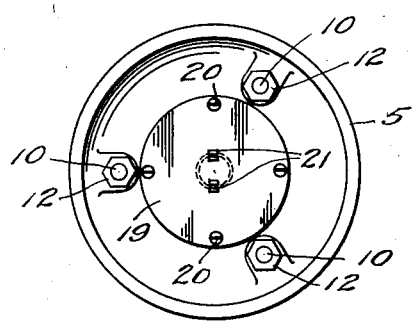

Figure 1 is a vertical elevation, partly in section of a smoker's stand embodying my improvements. Fig. 2 is a top plan view, and Fig. 3 is an underside view of the same.

Referring to said drawing, the numeral 5 represents a hollow base member having rigidly secured thereto one or more posts 6, three being shown, which serve to support a bowl member 7 of a substantially funnel shape. As shown, the base 5 and bowl 7 are disposed in axial alignment with each other and the posts 6 are arranged in spaced-apart relation concentrically of such axis.

In the present embodiment the posts are each provided adjacent its lower and upper ends with annular shoulders such as 8 and 9 to abut against bearing surfaces provided therefor on the base 5 and the bowl 7. Protruding from said shoulders through apertures of the respective members are studs 10 and 11 which are screw threaded to receive nuts 12 and 13 which coact with the associated shoulders for securing the posts to the base and to the bowl and afford a rigid structure constituting the stand proper.

In the present invention I provide an ash receptacle 14 in the nature of a tube open at the top and having its lower end closed by means of a floor 15 which is integral with the tubular portion of the receptacle.

At its top the receptacle 14 has an internal diameter to receive therein the spout 16 of the bowl 7, and its bottom diameter is such as to enter freely an aperture 17 provided in the base 5. The length of said receptacle is such that when its upper end is engaged with the bowl spout, the receptacle will extend into the base 5.

As illustrated in Fig. 1 the receptacle is yieldingly held in its engaged relation with the bowl by means of a spring 18 supported interiorly of the base upon a partition 19 which, as shown, is secured by means of screws 20 to the base.

21 represents clips or staples which serve to secure the spring to the partition 19.

22 represents a bridge piece which is advantageously mounted upon the bowl 7 for supporting cigars, pipes, or the like and also a match container such as 23.

As shown the bridge piece 22 is secured to the stand by interposing apertured portions of the bridge piece between the bowl and the nuts 13 at the respective post studs 11.

For use, the ash receptacle 14 occupies the position in which it is represented in Fig. 1 and when thus arranged cigar ashes, butts, burnt matches, or other refuse thrown into the bowl is collected in the receptacle.

For emptying, the receptacle is removed from the stand by first pushing the receptacle downwardly in opposition to the spring 18 until it is disengaged from the bowl spout 16, then swinging the receptacle into its dotted line $14^1$ position to clear the bowl 7, and, finally, lifting the receptacle from the base aperture 17.

To return the receptacle, the operations above stated are performed in reversed order.

What I claim, is,—

1. The combination with a rigid stand comprising a base member, a funnel shaped bowl member, and means secured to both of said members for holding the same in spaced-apart relation, of a removable ash receptacle having the respective ends thereof detachably connected with the base and bowl members of the stand.

2. The combination with a rigid stand having a base member provided with an opening in the top thereof, and a funnel shaped bowl member provided with a depending spout element, said members being secured in spaced-apart relation, of a tubular receptacle having its lower end engaging within the opening of the base member, and resilient means provided within said opening and acting against the receptacle for releasably engaging the upper end of the receptacle with the bowl spout.

3. The combination with a rigid stand comprising a base member having an opening in the top thereof, a plurality of post members extending upwardly from the base member, and a funnel shaped bowl member supported upon the posts, said bowl member being provided with a depending spout element, of a tubular receptacle having a closed lower end adapted to be inserted within the base opening, and a spring provided in said opening and tending to retain the upper end of the receptacle in engaged relation with the bowl spout.

4. The combination with a hollow base member provided with an opening in the top thereof, a bowl member having a spout element in axial alignment with said opening, a horizontal partition provided within the base member, posts having their upper and lower ends secured to the bowl and base members to afford therewith a rigid stand, of a tubular ash receptacle having its lower end adapted to enter the base opening, the upper end of the receptacle being adapted to receive therein the bowl spout element when the receptacle has its lower end engageable in the base, and resilient means mounted upon said partition for yieldingly retaining the receptacle in engaged relation with the bowl spout.

Signed at Seattle, Washington, this 7th day of July 1924.

WALKER G. ANDERSON.

Witness:
PIERRE BARNES.